United States Patent
Bakassian et al.

[11] 3,718,682
[45] Feb. 27, 1973

[54] PROCESS FOR OBTAINING HYDROGENOCHLOROSILANES

[75] Inventors: Georges Bakassian, Caluire; Andre Bazouin, Luzinay 38, both of France

[73] Assignee: Rhone-Poulenc S.A., Paris, France

[22] Filed: Dec. 20, 1971

[21] Appl. No.: 210,205

[30] Foreign Application Priority Data

Dec. 22, 1970 France..................7046220

[52] U.S. Cl........................260/448.2 P, 260/448.2 E
[51] Int. Cl.....................................C07f 7/08
[58] Field of Search...................260/448.2 P, 448.2 E

[56] References Cited

UNITED STATES PATENTS

| | | | |
|---|---|---|---|
| 2,909,549 | 10/1959 | Bailey | 260/448.2 P X |
| 2,421,653 | 6/1947 | Sauer | 260/448.2 P X |
| 3,101,361 | 8/1963 | Brown et al. | 260/448.2 P |
| 3,065,252 | 11/1962 | Brown et al. | 260/448.2 P |
| 3,549,680 | 12/1970 | Wegehaupt et al. | 260/448.2 E |

*Primary Examiner*—Daniel E. Wyman
*Assistant Examiner*—P. F. Shaver
*Attorney*—Stevens, Davis, Miller & Mosher

[57] ABSTRACT

Dialkylhydrogenochlorosilanes are obtained by reacting a siloxane

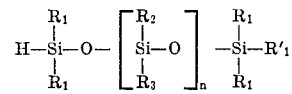

with a chlorosilane $(R_4)_p \, Si \, Cl_{4-p}$
in the presence of a hexaalkylphosphotriamide or N-alkyl-pyrrolidone, where $R_1$ is $C_1 - C_6$ alkyl, $R_2$, $R_3$, $R'_1$ and $R_4$ are alkyl or alkenyl having up to 6 carbon atoms, cycloalkyl or cycloalkenyl having 5 or 6 ring carbon atoms, or henyl, alkylphenyl or phenylalkyl and where $R'_1$ can also be hydrogen, and $R_4$ can also be hydrogen or chloromethyl, $n$ is zero or an integer up to 20, preferably 0 – 5, and $p$ is 0, 1 or 2.

8 Claims, No Drawings

PROCESS FOR OBTAINING HYDROGENOCHLOROSILANES

The present invention relates to a process for preparing hydrogenochlorosilanes by reaction of a siloxane compound with a chlorosilane.

So-called redistribution reactions which allow hydrogenochlorosilanes and siloxanes to be prepared by reaction of a chlorosilane with a siloxane compound, e.g. a disiloxane or a linear polysiloxane, are already known and U.S. Pat. specification Nos. 3,065,252 and 3,101,361 describe one-component or two-component catalytic systems for use in such reactions. The catalysts consist essentially of aliphatic or aromatic amines, quarternary ammonium hydroxides or salts of carboxylic acids with amines or with a quarternary ammonium hydroxide, and for some of these derivatives it is essential that they are used in association with a solvent of high dielectric constant.

The present invention provides a process for preparing a hydrogenochlorosilane of the general formula:

(I)

wherein the symbols $R_1$, which may be identical or different, represent a straight or branched alkyl group having one to six carbon atoms, which comprises reacting a siloxane or polysiloxane of the general formula:

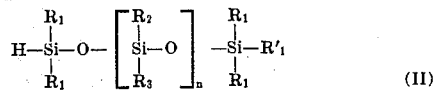

(II)

with a chlorosilane of the general formula:

$$(R_4)_p \, Si \, Cl_{4-p},$$ (III)

wherein $R_2$, $R_3$, $R'_1$ and $R_4$, which may be identical or different: each represent a straight or branched alkyl or alkenyl group having up to 6 carbon atoms, a cycloalkyl or cycloalkenyl group having five or six nuclear carbon atoms, or a phenyl, alkylphenyl or phenylalkyl group; and wherein $R'_1$ can also represent a hydrogen atom and $R_4$ a chloromethyl group or a hydrogen atom, $n$ is 0 or an integer less than or equal to 20, $p$ is 0, 1 or 2, the reaction being carried out in the presence of a hexaalkylphosphotriamide or of an N-alkyl-pyrrolidone.

In the above formulae, $n$ is preferably 0 – 5. When one or more of $R_1$, $R_2$, $R_3$ or $R_4$ is alkylphenyl or phenyl alkyl, the alkyl residue may be straight or branched and contain up to six carbon atoms.

Siloxanes of the formula (II) which may be used include 1,1,3,3-tetramethyldisiloxane, 1,3-dimethyl-1,3-diethyldisiloxane, pentamethyldisiloxane, 1,1,5,5-tetramethyl-3,3-diphenyltrisiloxane, a bis-α, ω-dimethylsilyl-polydimethylsiloxane, a bis-α,ω-dimethylsilyl-polydiphenylsiloxane and a bis-α, ω-dimethylsilyl-polymethylvinylsiloxane.

Chlorosilanes of the formula (III) which may be used include dimethyl-dichlorosilane, methyl-hydrogenodichlorosilane, divinyldichlorosilane, methylphenyldichlorosilane, diphenyldichlorosilane, methyltrichlorosilane, phenyltrichlorosilane, vinyltrichlorosilane and tetrachlorosilane.

The catalysts used in this invention make it possible to achieve high reaction speeds and generally to achieve a complete redistribution reaction, and virtually to avoid side-reactions. These catalysts have the general formula:

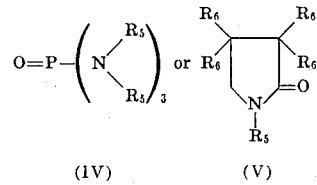

(IV)    (V)

in which the symbols $R_5$, which may be identical or different, each represent a straight or branched alkyl radical with 1 to 6 carbon atoms, and the symbols $R_6$, which may be identical or different, each represent a hydrogen atom or a straight or branched alkyl radical with one to six carbon atoms. In practice, the process according to the invention is carried out in the presence either of hexamethylphosphotriamide or of N-methyl-pyrrolidone, which are currently industrially easily obtainable solvents.

The redistribution reaction between the siloxane compound (II) and the chlorosilane (III) can be regarded as involving the cleavage of the terminal siloxane bond which joins a dialkylhydrogenosilyl group to the remainder of the molecule. This cleavage is thereafter followed by attachment of a chlorine atom — originating from the chlorosilane — to the H Si $(R_1)_2$ — groups liberated. The divalent radical originating from the siloxane compound (II) can thereafter combine with the $(R_4 2_p \, Si \, Cl_{(3-p)}$ —radicals. A disiloxane or a polysiloxane can thus be obtained.

The reactants can be used in molar proportions which vary over a wide range. As a general rule, an amount of chlorosilane (III) greater than that corresponding to the stoichiometry of the reaction is used in order to achieve as high a degree of conversion of the siloxane compound as possible. The stoichiometry of the reaction requires one molecule of chlorosilane (III) per silicon-oxygen bond broken.

The amount of catalyst employed can also vary within wide limits. This amount, expressed by weight, is generally from 0.1 to 10 and preferably 0.5 to 5 percent of the total mass of the reactants.

The redistribution reaction can be carried out at a temperature of between 0° and 250° C and preferably between 20° and 200° C.

After the reactants and catalyst have been mixed, the reaction mixture is heated to the desired temperature and following the substantial completion of the reaction, the products obtained are separated by any known method. Amongst these, fractional distillation is particularly valuable.

According to a variant of the process, it is also possible to heat the reactants under reflux whilst simultaneously ensuring that the volatile compounds produced during the reaction distil.

The process according to the invention makes it possible to convert hydrogenosiloxanes into hydrogenosilanes and so utilize the hydrogenosiloxanes for conversion into the more useful hydrogenosilanes. It is well known that hydrogenosilanes are greatly valued in industry because by addition of unsaturated molecules to them, many silicon-containing derivatives can be obtained.

The process of the invention also makes possible the purification of hydrogenosilanes contaminated by organic compounds of very similar boiling points; the mass of the hydrogenosilanes to be purified is hydrolyzed, the dihydrogenosiloxanes produced are isolated by distillation and the hydrogenochlorosilanes are then regenerated by the redistribution reaction, using the process according to the invention; thereafter, the hydrogenochlorosilanes can be isolated by distillation.

The Examples which follow illustrate the invention. Temperatures are in °C.

EXAMPLE 1

1,340 g of 1,1,3,3-tetramethyl-dihydrogenodisiloxane, 3,870 g of dimethyldichlorosilane and 10 cm³ of hexamethylphosphotriamide (HMPT) are introduced into a 10 l flask, the reactants are heated to the reflux temperature and the volatile constituents are distilled over the course of 26 hours. During the period of heating, the temperature in the vessel rises from 65° to 172° and 1,819 g of a first fraction $F_1$, of b.p. 35°–35.5°, which is dimethylhydrogeno-chlorosilane, 1,230 g of a second fraction $F_2$, of b.p. 69.5°–72°, which is dimethyldichlorosilane, and 1,760 g of a third fraction $F_3$, of b.p. 136°–137° which is tetramethyl-dichlorodisiloxane, are collected.

EXAMPLE 2

A mixture of 486 g of diphenyldichlorosilane, 134 g of 1,1,3,3-tetramethyl-dihydrogenodisiloxane and 5 cm³ of HMPT is heated under reflux for 17 hours 30 minutes during the period of heating, the temperature in the vessel rises from 89° to 165°) whilst distilling the volatile constituents. The residue is then distilled under reduced pressure and the following fractions obtained:

$F_1$ : b.p. 35°–35.5°; 32 g; pure dimethylhydrogenochlorosilane.

$F_2$: b.p. 67° – 69.5°; 54 g; tetramethyldihydrogenosiloxane.

$F_3$ : b.p. $_{0.2}$, 103° – 104°; 238 g; diphenyldichlorosilane.

EXAMPLE 3

A reaction mixture consisting of 134 g of 1,1,3,3-tetramethyl-dihydrogenodisiloxane, 340 g of silicon tetra-chloride and 5 cm³ of HMPT is heated under reflux for 9 hours 10 minutes the temperature ranging between 60° – 112°. Distillation while heating under reflux yields 180 g of a fraction $F_1$, b.p. 35.5° – 36°, which is pure dimethylhydrogenochlorosilane.

EXAMPLE 4

A mixture of 67 g of 1,1,3,3-tetramethyl-dihydrogeno-disiloxane 211.5 g of phenyl-trichlorosilane and 5 cm³ of HMPT is heated under reflux for 6 hours the temperature ranging between 75° – 145°. Distillation during refluxing yields 45 g of a fraction $F_1$, b.p. 35.5° which is pure dimethylhydrogenochlorosilane.

EXAMPLE 5

A mixture of 67 g of 1,1,3,3-tetramethyl-dihydrogenodisiloxane, 183 g of chloromethyl-trichlorosilane and 5 cm³ of HMPT is heated under reflux for 9 hours 45 minutes the temperature ranging between 86° – 148°. Distillation during refluxing yields 18 g of a fraction $F_1$, b.p. 35.5°, which is pure dimethylhydrogenochlorosilane.

EXAMPLE 6

A mixture of 148 g of pentamethylhydrogendisiloxane, 387 g of dimethyldichlorosilane and 5 cm³ of HMPT is heated under reflux for 15 hours, the temperature ranging between 67° – 120°. Distillation during refluxing yields 83 g of a fraction, b.p. 36°, which is dimethylhydrogenochlorosilane.

EXAMPLE 7

A mixture of 134 g of 1,1,3,3-tetramethyl-dihydrogenodisiloxane, 429 g of methylethyl-dichlorosilane and 5 cm³ of HMPT is heated under reflux for 12 hours 30 minutes, the temperature ranging between 94° – 170°. Chromatographic analysis shows that the distillate recovered during refluxing contains 98 g of dimethylhydrogeno-chlorosilane.

EXAMPLE 8

A mixture consisting of 162 g of 1,3-dimethyl-1,3-diethyl-dihydrogenodisiloxane, 387 g of dimethyldichlorosilane and 5 cm³ of HMPT is heated under reflux for 12 hours 30 minutes, the temperature ranging between 76° – 140°. The distillate obtained during refluxing contains 156.5 g of methylethylhydrogenochlorosilane, the determination being carried out by chromatographic analysis.

EXAMPLE 9

A mixture of 332 g of 1,1,5,5-tetramethyl- 3,3-diphenyltrisiloxane, 774 g of dimethyldichlorosilane and 15 cm³ of HMPT is heated under reflux for 24 hours, the temperature ranging between 74° – 78°. Chromatographic analysis shows that the distillate obtained during refluxing contains 109.5 g of dimethylhydrogenochlorosilane.

EXAMPLE 10

A mixture of 201 g of 1,1,3,3-tetramethyl-dihydrogenodisiloxane, 460 g of methyldichlorosilane and 5 cm³ of HMPT is heated under reflux for 15 hours 30 minutes, the temperature ranging between 59°–160°. Chromatography of the fractions obtained by distillation during refluxing shows that 67 g of dimethylhydrogenochlorosilane have been formed.

EXAMPLE 11

A mixture of 134 g of 1,1,3,3-tetramethyl-dihydrogenodisiloxane, 387 g of dimethyldichlorosilane and 20 cm³ of N-methyl-pyrrolidone is heated under reflux for 16 hours, the temperature ranging between 74° – 109°. 78 g of dimethylhydrogenochlorosilane are distilled out from the mixture.

We claim:

1. Process for preparing a hydrogenochlorosilane of the general formula:

wherein the symbols $R_1$, which may be identical or different, represent a straight or branched alkyl group having one to six carbon atoms, which comprises reacting a siloxane or polysiloxane of the general formula:

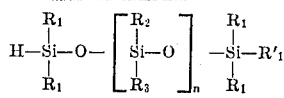

with a chlorosilane of the general formula:

$$(R_4)_p \, Si \, Cl_{4-p},$$

wherein $R_2$, $R_3$, $R'_1$ and $R_4$, which may be identical or different, each represent a straight or branched alkyl or alkenyl group having up to six carbon atoms, a cycloalkyl or cycloalkenyl group having five or six nuclear carbon atoms, or a phenyl, alkylphenyl or phenyalkyl group and wherein $R'_1$ can also represent a hydrogen atom and $R_4$ a chloromethyl group or a hydrogen atom, $n$ is 0 or an integer less than or equal to 20, $p$ is 0, 1 or 2, the reaction being carried out in the presence of a hexaalkylphosphotriamide or of an N-alkylpyrrolidone.

2. Process according to claim 1 wherein the reaction is carried out in the presence of a hexaalkylphosphotriamide of general formula

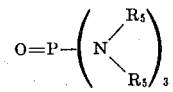

or an N-alkylpyrrolidone of general formula

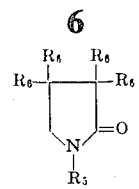

where the symbols $R_5$, which may be identical or different, each represent a straight or branched alkyl radical of one to six carbon atoms and the symbols $R_6$ which may be identical or different, each represent hydrogen or a straight or branched alkyl radical of one to six carbon atoms.

3. Process according to claim 2 wherein the reaction is carried out in the presence of hexamethylphosphotriamide or N-methyl-pyrrolidone-2.

4. Process according to claim 1 wherein 0.1 to 10 percent by weight hexaalkylphosphotriamide or N-alkylpyrrolidone is present based on the total weight of the siloxane and chlorosilane reactants.

5. Process according to claim 1 wherein more than one mole of chlorosilane is used per mole of siloxane reactant for each silicon-oxygen bond to be cleared in the siloxane reactant.

6. Process according to claim 1 wherein the reaction is carried out at 20°–200° C.

7. Process according to claim 1 wherein the siloxane reactant is a 1,1-dimethyl-1-hydrogeno-siloxane and the hydrogenochlorosilane product is dimethylhydrogeno-chlorosilane.

8. process according to claim 1 wherein the siloxane reactant is 1,1,3,3-tetramethyldisiloxane, 1,3-dimethyl-1,3-diethyldisiloxane, pentamethyldisiloxane, 1,1,5,-5-tetramethyl-3,3-diphenyl-trisiloxane, a bis-α,ω-dimethylsilylpolydimethylsiloxane, a bis-α,ω-dimethylsilyl-polydiphenyl-siloxane or a bis-α,ωdimethylsilyl-polymethylvinylsiloxane, the chlorosilane is dimethyldichlorosilane, methylhydrogenodichlorosilane, divinyldichlorosilane, methylphenyldichlorosilane, diphenyldichlorosilane, methyltrichlorosilane, phenyltrichlorosilane, vinyltrichlorosilane or tetrachlorosilane the reaction being carried out at a temperature between 20° and 200° C in the presence of 0.5 – 5 percent by weight hexamethylphosphotriamide or N-methyl-pyrrolidone-2 based on the total weight of siloxane and chlorosilane reactants.

* * * * *